United States Patent [19]
Alten et al.

[11] Patent Number: 5,247,855
[45] Date of Patent: Sep. 28, 1993

[54] ROLLER BEARING ASSEMBLY WITH COMPLIANT ANTI-ROTATION RING

[75] Inventors: Charles J. Alten, Scottsdale, Ariz.; Nagaraj K. Arakere, Wichita, Kans.

[73] Assignee: Allied Signal Inc., Morris Township, Morris County, N.J.

[21] Appl. No.: 848,763

[22] Filed: Mar. 10, 1992

[51] Int. Cl.[5] .................. F16H 57/02; F16C 27/00; F02C 3/02
[52] U.S. Cl. ................. 74/606 R; 384/536; 384/585; 60/39.45; 74/DIG. 5
[58] Field of Search ............... 74/606 R, DIG. 5; 384/535, 536, 581, 582, 585; 60/39.45

[56]         References Cited
        U.S. PATENT DOCUMENTS

| | | | |
|---|---|---|---|
| 3,897,984 | 8/1975 | Mathenny, Jr. | 384/582 |
| 4,195,947 | 4/1980 | Lambertz | 404/112 |
| 4,696,587 | 9/1987 | Nishida et al. | 384/582 X |
| 4,896,239 | 1/1990 | Ghose | 384/536 X |

FOREIGN PATENT DOCUMENTS

| | | | |
|---|---|---|---|
| 1400313 | 10/1968 | Fed. Rep. of Germany | 384/536 |
| 58-211016 | 12/1983 | Japan | 384/536 |
| 143658 | 1/1954 | Sweden | 384/536 |
| 386186 | 5/1965 | Switzerland | 384/535 |

Primary Examiner—Allan D. Herrmann
Assistant Examiner—David W. Laub
Attorney, Agent, or Firm—Robert A. Walsh; Troy Lester; Jerry J. Holden

[57]         ABSTRACT

An improved rolling element bearing assembly is provided which is particularly applicable for use in gas turbine engine gearboxes. The rolling element bearing includes an inner ring mounted to a rotatable shaft and an outer ring mounted to a stationary structure. The inner and outer rings define a raceway for a plurality of rolling elements. The rolling element bearing assembly includes the bearing and a compliant anti-rotation ring compressed between the bearing outer ring and the stationary structure. The compliant ring provides improved frictional engagement and improved bearing damping between the bearing outer race and the stationary structure preventing outer ring rotation within the stationary housing.

8 Claims, 2 Drawing Sheets

ROLLER BEARING ASSEMBLY WITH COMPLIANT ANTI-ROTATION RING

TECHNICAL FIELD

This invention relates generally to roller bearing assemblies for mechanical applications, and in particular, to a novel rolling element bearing assembly having an improved anti-rotation ring.

BACKGROUND OF THE INVENTION

One type of rolling element bearing assembly used in mechanical applications is a hard mount assembly. Hard mount assemblies differ from other assemblies in that the rolling element bearing is interposed between a rotatable shaft and stationary structure without a squeeze film or spring cage damper. A standard bearing is comprised of a plurality of rolling elements confined to a raceway defined by an inner ring and an outer ring. In a standard hard mount assembly, the bearing's inner ring is mounted to the rotatable shaft so that the inner ring and shaft rotate together during engine operation and the bearing's outer ring is slip fit mounted to the stationary structure so that the top surface of the bearing is encircled by the inner surface of the structure. The outer ring is frictionally secured to the stationary housing through mechanical loads which usually create a normal force on one side of the bearing. Frictionally engaging the outer ring to the stationary structure through an interference fit will create a high compressive load on the rolling elements and will impede the rotation thereof.

In a hard mount bearing assembly, the bearing is usually made of bearing quality steel, the rotatable shaft is usually made of steel, and the stationary structure is often made of lower strength material to reduce weight.

The purpose of the rolling element bearings is to position rotatable shafts in the stationary structure and transfer the radial loads from the shaft to the structure while permitting relatively low friction rotation of the shaft.

A common disadvantage to hard mount bearing assemblies is that uncoupling of the frictional engagement between the outer ring and the stationary structure can create significant rubbing and wear resulting in a misaligned bearing mount. In a hard mount assembly, the bearing mounting is the shaft and the stationary structure race, both of which should be cylindrical as opposed to being coned or out-of-round. Noncylindrical surfaces results in the inner and outer rings not forming a circular race causing excessive rubbing of the rolling elements against the race which shortens bearing life.

Misalignment from bearing outer ring rub is particularly evident for a stationary structure of a material which has a greater coefficient of thermal expansion and is softer than bearing steel, such as aluminum. During mechanical operation, the temperatures of the shaft, the bearing and the stationary structure will often increase causing the stationary structure race to expand more than the bearing. As the components thermally grow apart, the frictionally engaged area between the bearing outer ring and the structure is decreased resulting in the bearing outer ring rotating within the structure due to circumferential forces and vibration exerted from the shaft. The harder, bearing outer ring will wear the softer, stationary structure creating debris and a misaligned bearing mount. The debris will often embed itself into the rolling element bearing inhibiting the bearing rotation and the misaligned mount causes additional bearing wear as explained above.

The common prior art has been to press fit the bearing outer ring into the stationary structure and press fit the inner race to the rotatable shaft or to insert an anti-rotation pin between the bearing outer ring and the stationary housing. As discussed above, press fitting is very disadvantageous because of the large compressive forces that clamp the rolling elements resulting in higher rolling friction and a very short bearing life. Anti-rotation pins have proved to be expensive and difficult to incorporate. U.S. Pat. No. 4,195,947 discloses a method of overcoming outer ring rotation in compacting rollers by securing the inner ring and outer ring by a plurality of threaded screws. This method of anti-rotating is disadvantageous because it increases the number of components significantly and increases the space required for the bearing.

Accordingly, a need exists for rolling element bearing assemblies that resist the circumferential forces and vibration exerted by the rotating shaft to prevent bearing misalignment and the creation of debris.

SUMMARY OF THE INVENTION

An object of the present invention is to provide a rolling element bearing assembly that inhibits damage to the stationary structure by having improved resistance to outer ring circumferential rotation caused by shaft exerted forces.

Another object of the present invention is to provide a rolling element bearing assembly that maintains bearing alignment while utilizing a compliant anti-rotation ring.

The present invention achieves the above-stated objectives by providing a rolling element bearing assembly having a compliant anti-rotation ring compressed between the bearing outer ring and the stationary structure. The compliant ring provides improved frictional engagement and improved bearing damping between the bearing outer race and the stationary structure, thereby preventing the bearing outer ring from rotating inside the housing.

These and other objects, features and advantages of the present invention, are specifically set forth in, or will become apparent from, the following detailed description of a preferred embodiment of the invention when read in conjunction with the accompanying drawings.

DESCRIPTION OF THE PREFERRED EMBODIMENT

Figure 1:
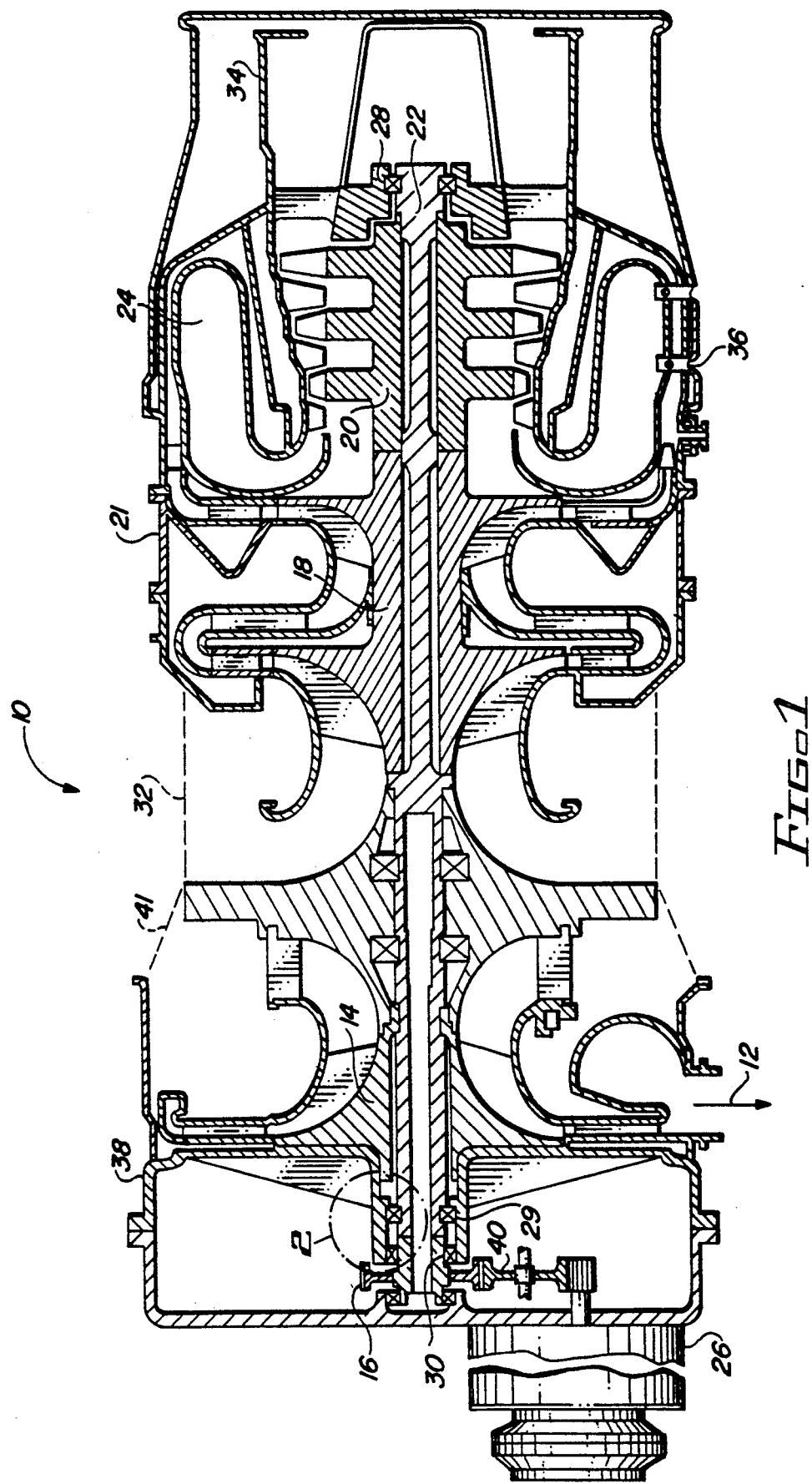
FIG. 1 is a partial schematic, cross sectional view of an auxiliary power unit with a gearbox incorporating the rolling element bearing assembly contemplated by the present invention.

Referring to the drawings, FIG. 1 schematically depicts a gas turbine engine 10 in an auxiliary power unit configuration. The engine 10 is comprised of a two stage compressor 18, driven by a three stage turbine 20 via an interconnecting shaft 22 that is journaled to outer structure 21 via bearings 28 and 29. A reverse flow annular combustor 24, is operably disposed between the compressor 18, and the turbine 20. During engine operation, air is inducted through a perforated inlet housing 32 and pressurized by the compressor 18. The pressurized air flows into the combustor 24 where it is mixed with fuel supplied via tubing from a source not shown through fuel nozzles 36 and burned in the combustor 24. The hot, pressurized gas then expands across the turbines 20 which extracts the pressure energy of the gas converting it into kinetic energy for providing power. Finally, the air exits through the exhaust duct 34 into the atmosphere.

An accessory drive unit 16 and a load compressor 14 are shown to be driven by the shaft 22. The accessory drive unit 16 is a gear that transfers mechanical power to one or more accessories 26, which for example may be a fuel control pump or a lube oil pump, through a plurality of intermeshing gears 40. Air inducted through the load compressor side of the perforated inlet housing 41 is compressed by the load compressor 14 and channelled as pressurized air represented by arrow 12.

A gearbox housing 38 is attached to the inlet housing 41 and is preferably made of low weight material such as aluminum or magnesium, both being softer than bearing steel. In a manner familiar to those skilled in the art, the drive unit 16 and gears 40 are journaled within the gearbox 38 by a plurality of rolling element bearings 30.

Figure 2:
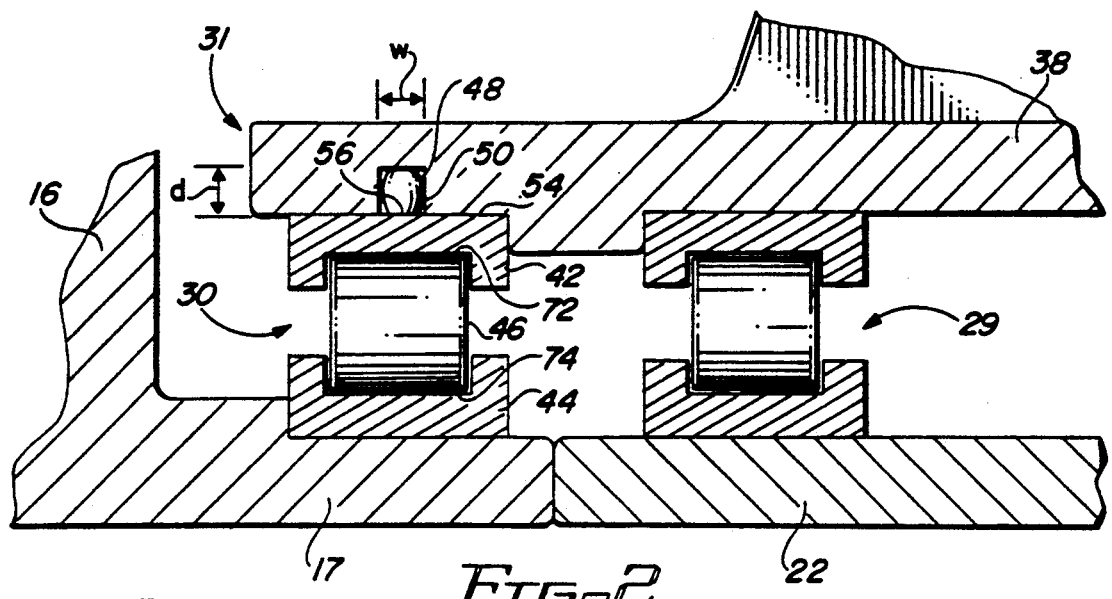
FIG. 2 is an enlarged view of a portion of FIG. 1 represented by the dashed circle 2.

Referring now to FIG. 2, which is the enlarged view of the bearing assembly 31 within the dashed circle of FIG. 1. The rolling element bearing assembly 31 is comprised of the rolling element bearing 30 with an inner ring 44 mounted for rotation with a gearshaft 17 of drive unit 16 and an outer ring 42 slip fit in the gearbox housing 38 and encircling the inner ring 44. The bearing's inner and outer rings 44 and 42 with opposite facing channels 74 and 72 define a raceway for receiving a plurality of circumferentially disposed rolling elements 46 (only one shown), such as ball bearings or roller bearings. A compliant ring 48 is mounted to be in radial compression between the bearing outer ring 42 and the gearbox housing 38. Preferably each component of the rolling element bearing 30 is made from bearing steel.

Figure 3:
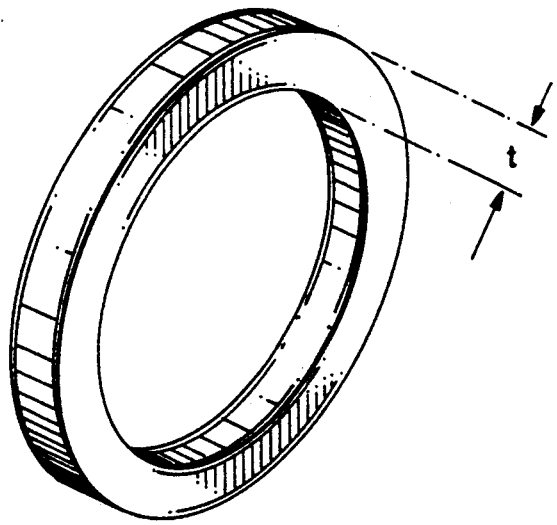
FIG. 3 is a perspective view of the compliant ring contemplated by the present invention.

In the preferred embodiment, the compliant ring 48 is placed in a circumferential groove 50 of depth "d" in the gearbox housing 38 approximately in the axial center of the bearing 30. Preferably, the compliant ring 48 is compressed so that it does not create a noncylindrical bearing mount. This can be practiced by compressing the compliant ring 48 so that the compliant ring's inner radial surface 56 is approximately flush with the gearbox housing inner race 54. To accomplish this, the groove 50 depth "d" is machined to a depth equal to the compliant ring's compressed thickness which is from about 70% to 90% of its uncompressed radial thickness "t" shown in FIG. 3. Proper width "w" should be given to the groove 50 to allow for the axial growth of the ring when compressed. Preferably, the compliant ring 48 is rectangular in shape, as shown in FIG. 3, so that it maintains a flat surface and provides sufficient frictional engagement. The ring should be made from an elastomeric material that has low setting, meaning it substantially returns to its original shape when uncompressed and is compatible with the oils and temperature in the surrounding environment.

During engine operation, the shaft 22 transfers torque to the gearshaft 17. The rotation of the gearshaft 17 is accompanied by rotation of the inner ring 44, which transfers torque to the outer ring 42 through rolling motion of the rolling elements 46. Compliant ring 48 compression of 10% to 30% provides substantial frictional resistance to bearing outer ring circumferential rotation as well as some damping of shaft vibrations which better prevents damaging of the gearbox housing 38.

In the preferred embodiment, the compliant ring 48 is approximately square with an uncompressed radial thickness "t" of approximately 0.07 in. (0.1778 cm) and is compressed to a thickness of approximately 0.055 in. (0.1397 cm). The depth of the groove 50 is approximately 0.055 in. (0.1397 cm), the outer diameter is approximately 1.214 in. (3.08356 cm), and the width is approximately 0.099 in. (0.25136 cm). The ring is preferably made of a fluorocarbon elastomer or nitrile could be used for lower temperature applications.

Figure 4:
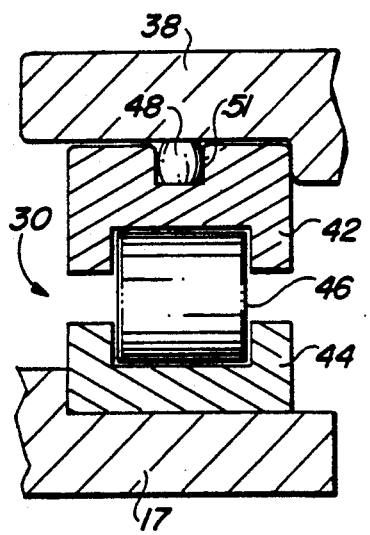
FIG. 4 is an enlarged view of FIG. 2 showing a different embodiment of the current invention.

FIG. 4 presents an alternative embodiment of the present invention. As shown, the compliant ring 48 is placed in a circumferential groove 51 in the outer ring 42. In this embodiment, the outer ring 42 is shown to be radially thicker than in FIG. 2 to insure sufficient structural thickness. As in FIG. 2, the groove is placed in the axial center of the bearing 30 to prevent bearing misalignment. This embodiment would be particularly advantageous when rework of a prior art bearing assembly is necessary to incorporate the present invention.

Another alternate configuration of the present invention includes incorporating the bearing assembly 31 for bearings 28 or 29 which position the shaft 22.

It will be apparent to those skilled in the relevant arts from this specification that the invention disclosed herein can be used for positioning rolling element bearing systems made of steel which are interposed in proximity to softer materials such as magnesium or aluminum such as onboard auxiliary power units or gas turbine engines. It is therefore understood that the present invention can be utilized in any mechanical application that requires prevention of outer ring rotation.

Various modification an alterations to the above described rolling element bearing assembly will also be apparent to those skilled in the art. Accordingly, the foregoing detailed description of the preferred embodiment of the invention should be considered exemplary in nature and not as limiting to the scope and spirit of the invention as set forth in the following claims.

What is claimed is:

1. A rolling element bearing assembly for journaling a rotatable shaft to a stationary structure having a groove and inner race, comprising:

an inner ring secured to said shaft for rotation therewith and having about its radially outer surface a first channel;

an outer ring encircling said inner ring and being radially spaced therefrom, said outer ring's outer surface being adjacent said stationary structure and inner surface having a second channel, said first and second channels defining a raceway therebetween;

a plurality of rolling elements circumferentially disposed in said raceway; and a compliant ring disposed in said groove and circumferentially interposed and sufficiently, radially compressed between said outer ring and said stationary structure to frictionally engage said outer ring;

wherein said groove has a radial depth between 75% and 90% of said compliant ring's uncompressed thickness, and said compliant rings compressed thickness is between 75% and 90% of said compliant ring's uncompressed thickness, whereby said compliant ring's inner surface when compressed is substantially flush with said inner race of said stationary housing.

2. A bearing assembly as set forth in claim 1, wherein said compliant ring is elastomeric.

3. A bearing assembly as set forth in claim 2, wherein said compliant ring cross-section is approximately rectangular.

4. A bearing assembly as set forth in claim 1, wherein said inner ring and said outer ring are made of bearing steel and said stationary structure is made of a material softer than bearing steel.

5. A gearbox for a gas turbine engine comprising:
a housing having a groove and an inner race;
a plurality of gears having gearshafts disposed in said housing; and
a plurality of rolling element bearings assemblies for journaling each of said gears to said housing;
wherein at least one of said rolling element bearing assemblies is comprised of:
an inner ring secured to one of said gearshafts for rotation therewith;
an outer ring encircling said inner ring and being radially spaced therefrom, said outer ring's outer surface adjacent said inner race;
a plurality of rolling elements circumferentially disposed in said space between said inner and outer ring; and
a compliant ring disposed in said groove and surrounding said outer ring and being sufficiently, radially compressed between said outer ring and said housing to frictionally engage said outer ring and inhibit rotation thereof;
wherein said groove has a radial depth between 75% and 90% of said compliant ring's uncompressed thickness, and said compliant rings compressed thickness is between 75% and 90% of said compliant ring's uncompressed thickness, whereby said compliant ring's inner surface when compressed is substantially flush with said inner race of said housing.

6. A gearbox as set forth in claim 5, wherein said compliant ring is elastomeric.

7. A gearbox as set forth in claim 6, wherein said compliant ring cross-section is approximately rectangular.

8. A gearbox for a gas turbine engine comprising:
a housing having an inner race;
a plurality of gears having gearshafts disposed in said housing; and
a plurality of rolling element bearings assemblies for journaling each of said gears to said housing;
wherein at least one of said rolling element bearing assemblies is comprised of:
an inner ring secured to one of said gearshafts for rotation therewith;
an outer ring encircling said inner ring and being radially spaced therefrom, said outer ring's outer surface adjacent said inner race;
a plurality of rolling elements circumferentially disposed in said space between said inner and outer ring; and
a compliant ring surrounding said outer ring and being sufficiently, radially compressed between said outer ring and said housing to frictionally engage said outer ring and inhibit rotation thereof;
wherein said outer surface having a circumferential groove with a depth from about 75% to 90% of the uncompressed radial thickness of said compliant ring, for receiving and frictionally engaging said compliant ring and wherein said compliant ring's compressed thickness is between 75% and 90% of said compliant ring's uncompressed radial thickness, whereby said compliant ring's outer surface is substantially flush with said outer ring's outer surface when compressed.

* * * * *